United States Patent [19]

Ohshima

[11] Patent Number: 5,170,451
[45] Date of Patent: Dec. 8, 1992

[54] OPTICAL WDM (WAVELENGTH DIVISION MULTIPLEX) COUPLER

[75] Inventor: Shigeru Ohshima, Yokohama, Japan

[73] Assignee: Kabushiki Kaisha Toshiba, Kawasaki, Japan

[21] Appl. No.: 798,818

[22] Filed: Nov. 27, 1991

[30] Foreign Application Priority Data

Nov. 29, 1990 [JP] Japan .................. 2-325259
Oct. 28, 1991 [JP] Japan .................. 3-280261

[51] Int. Cl.$^5$ ............................................. G02B 6/28
[52] U.S. Cl. ........................................... 385/43; 385/24; 385/42; 359/127
[58] Field of Search ............ 385/41, 42, 43, 47, 385/48, 24; 359/127

[56] References Cited

U.S. PATENT DOCUMENTS

| | | |
|---|---|---|
| 4,111,524 | 9/1978 | Tomlinson, II . |
| 4,305,641 | 12/1981 | Witte .................. 885/43 X |
| 4,400,055 | 8/1983 | Ozeki et al. .......... 385/43 |
| 4,822,128 | 4/1989 | Imoto et al. .......... 385/43 |
| 4,926,412 | 5/1990 | Jannson et al. . |

FOREIGN PATENT DOCUMENTS

| | | |
|---|---|---|
| 2096350 | 10/1982 | United Kingdom . |
| 2127575 | 4/1984 | United Kingdom . |
| 2139374 | 11/1984 | United Kingdom . |
| 2182163 | 5/1987 | United Kingdom . |
| 2219869 | 12/1989 | United Kingdom . |

OTHER PUBLICATIONS

"Passive Stabilization Scheme for Fiber Interferometers Using (3×3) Fiber Directional Couplers", Applied Physics Letters, 1982, vol. 41, No. 7, pp. 616-618, K. P. Koo et al.
"In-Line Single-Mode Wavelength Division Multiplexer/Demultiplexer" Electronics Letters, 1984, vol. 20, No. 23, pp. 963-964, C. M. Lawson et al.
"Passive Optical Local Networks for Telephony Applications and Beyond", Electronics Letters, 1987, vol. 23, No. 24, pp. 1255-1257, J. R. Stern et al.

Primary Examiner—John D. Lee
Assistant Examiner—Phan T. Heartney
Attorney, Agent, or Firm—Oblon, Spivak, McClelland, Maier & Neustadt

[57] ABSTRACT

In an optical coupler of this invention, second and third single mode optical fibers are arranged to be parallel with each other with a first single mode optical fiber intervening therebetween, and a region in which the second and third optical fibers are linearly symmetrical with each other about the first optical fiber as the center is distribution-coupled. The coupling length of distributed coupling is set such that when the first and second light waves having a wavelength λ1 and a wavelength λ2 different from the wavelength λ1 are incident on one port of the first optical fiber, the first light wave is emitted from the other port of the first optical fiber and the second light wave is emitted from the second and third optical fibers.

10 Claims, 5 Drawing Sheets

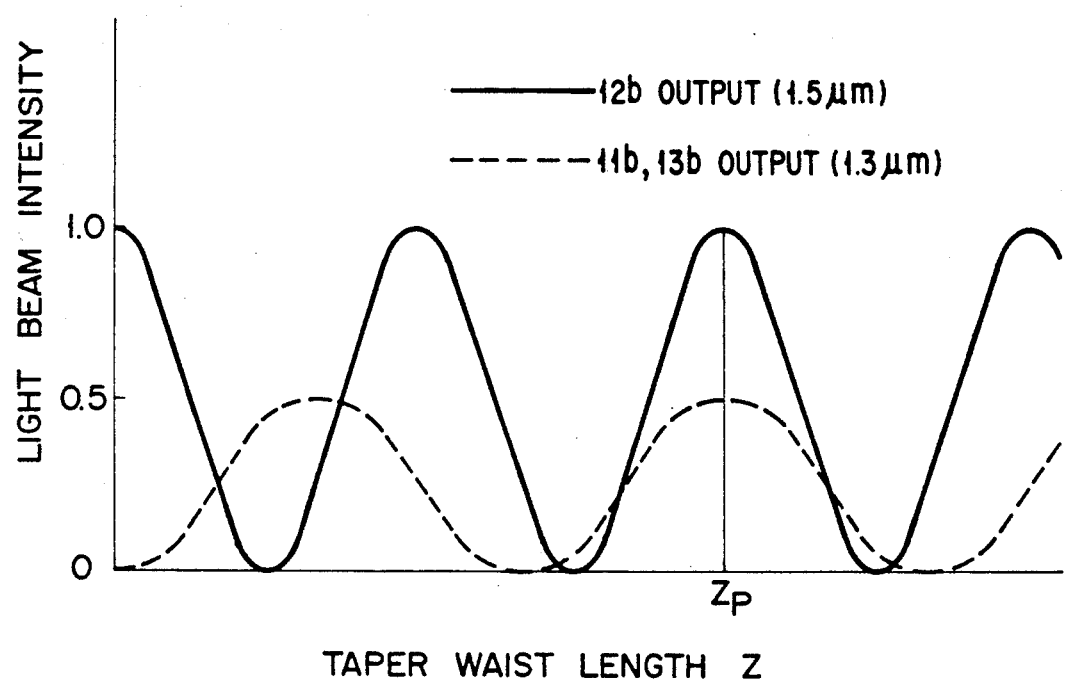
F I G. 3

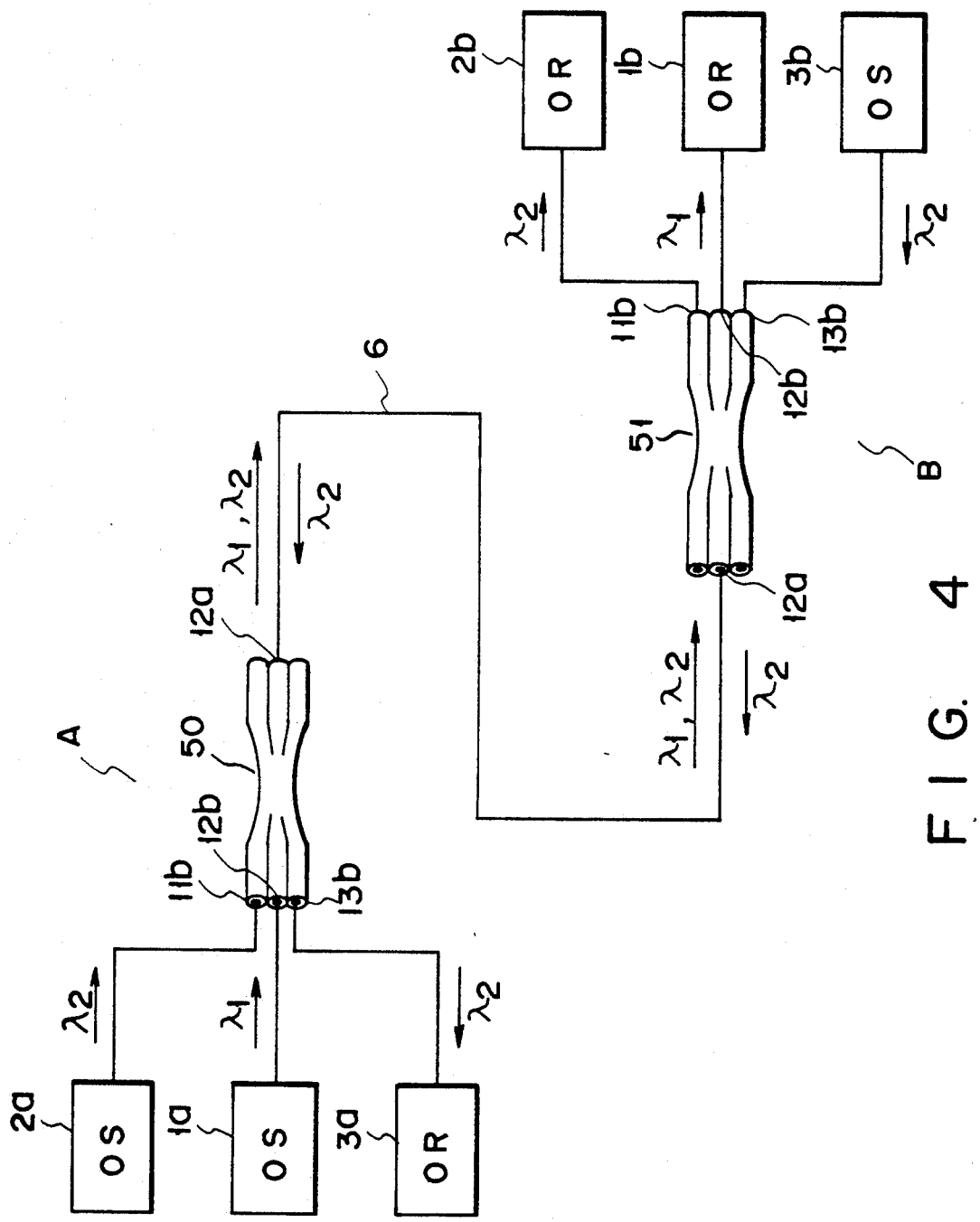
F I G. 4

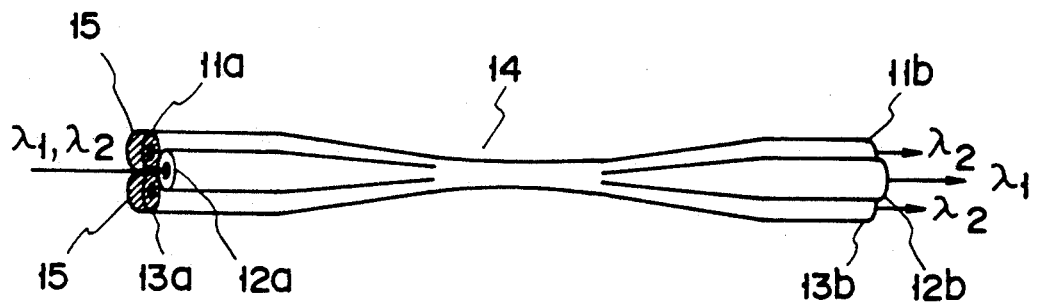
F I G. 5
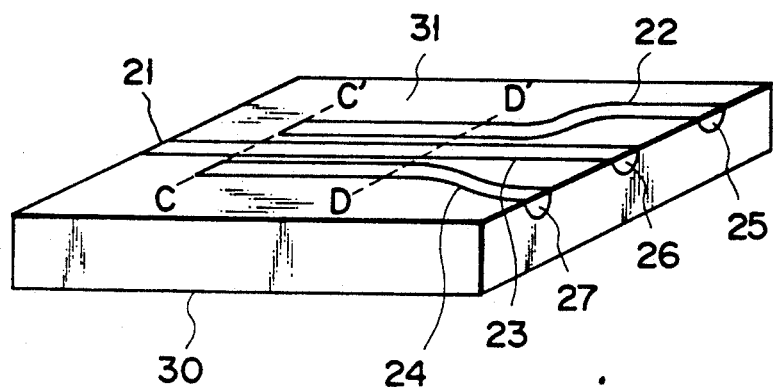
F I G. 6
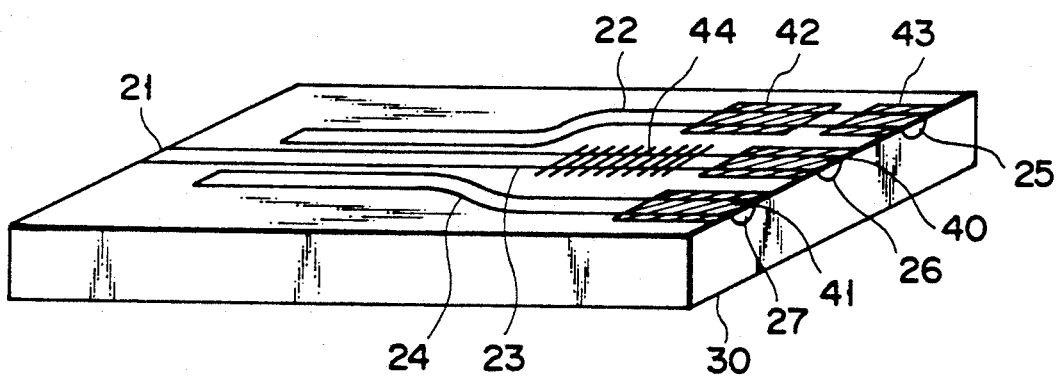
F I G. 7

OPTICAL WDM (WAVELENGTH DIVISION MULTIPLEX) COUPLER

BACKGROUND OF THE INVENTION

1. Field of the Invention

The present invention relates to an optical coupler which can be used for, e.g., a one-directional large-capacity/bidirectional small-capacity subscription type optical communication system adapting a time-compression, multiplexing technique.

2. Description of the Related Art

Recently, a so-called subscription type optical communication system is under development in a large scale, in which optical fibers are provided in not only a conventional basic trunk network connecting exchanges but also a subscriber network connecting exchanges and buildings so that voices, computer data, images and the like can be simultaneously transmitted at a high speed. An optical transmission system as shown in FIG. 1 is proposed in the form of such a system.

Referring to FIG. 1, reference symbol A denotes an exchange; and B, a subscriber station. First, in the exchange A, reference numeral 1a denotes a large-capacity (e.g., several hundreds of Mbits/sec.) optical transmitter. The optical transmitter 1a outputs an optical signal having a wavelength $\lambda 1$ to an optical fiber 6 serving as a transmission path between the exchange A and the subscriber station B via an optical multiplexer/demultiplexer 5. Reference numeral 2a denotes a small-capacity (e.g., several tens of Mbits/sec.) optical transmitter which transmits a light wave having a wavelength $\lambda 2$. Reference numeral 3a denotes a small-capacity optical receiver which receives the light wave having the wavelength $\lambda 2$. The optical receiver and transmitter 3a and 2a are connected to the optical fiber 6 via a directional coupler 4 and the optical multiplexer/demultiplexer 5.

The subscriber station B opposing the exchange A has a large-capacity optical receiver 1b, a small-capacity optical receiver 2b, and a small-capacity optical transmitter 3b. The light waves having wavelengths $\lambda 1$ and $\lambda 2$ which are transmitted through the optical fiber 6 are demultiplexed by the optical multiplexer/demultiplexer 7. The light wave having the wavelength $\lambda 1$ is received by the optical receiver 1b. The light wave having the wavelength $\lambda 2$ is received by the optical receiver 2b via a directional coupler 8. The small-capacity transmission with the wavelength $\lambda 2$ is so-called ping-pong transmission in which transmission and reception are performed bidirectionally in a time-divisional manner. For this purpose, this system uses the directional couplers 4 and 8.

In the optical transmission system described above, the wavelength $\lambda 1$ is assigned to large-capacity information transmission such as TV distribution services, and the wavelength $\lambda 2$ is assigned to small-capacity information transmission such as telephone services. Then, two different services can be independently transmitted by using a single transmission path optical fiber.

However, the optical transmission system described above has the following drawbacks as each station uses an optical multiplexer/demultiplexer and a directional coupler.

(1) The optical multiplexer/demultiplexer and the directional coupler must be connected, and this connection is time-consuming and requires much labor.

(2) A connection loss occurs at the connecting portion of the respective optical components with the optical fiber.

(3) As the number of optical components is large, the system becomes large. The place where the system can be installed is limited especially when the system is to be installed in a building or house.

SUMMARY OF THE INVENTION

As described above, in a one-directional large-capacity/bidirectional small-capacity optical transmission system adapting time-compression multiplexing technique as so-called ping-pong transmission, the optical multiplexers/demultiplexers and the directional couplers are used. Therefore, connection of these optical components requires much time and labor, and the connection loss and the system size are increased. These problems must be solved by developing a subscription type optical communication system.

The present invention has been made to solve the problems described above, and has as its object to provide an optical coupler having both a function as an optical multiplexer/demultiplexer and a function as a directional coupler.

According to the invention, there is provided an optical coupler comprising:

a first optical transmission path having one port as an incident port of a first light wave having a first wavelength and a second light wave having a second wavelength different from the first wavelength; second and third optical transmission paths arranged to be parallel with each other with said first transmission path intervening therebetween; and optical coupling mean for distributed coupling a region in which said second and third optical transmission paths are arranged to be linearly symmetrical with each other about said first optical transmission path as the center, and setting a coupling length of the distributed coupling region such that the other port of said first optical transmission path becomes an output port of the first light wave and one port of each of said second and third optical transmission paths becomes an output port of the second light wave.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 to 7 are views for respectively describing the embodiment according to the present invention, in which FIG. 2 is a perspective view showing the structure of a optical coupler using single mode optical fibers;

FIG. 3 is a graph indicating the multiplexing/demultiplexing characteristics of the optical coupler shown in FIG. 2;

FIG. 4 is a system diagram showing the schematic configuration of the optical coupler of FIG. 2 applied to the optical transmission system of FIG. 1;

FIG. 5 is a perspective view showing the structure of an optical coupler in which the distal ends of two optical fibers are fabricated to provide reflectionless termination;

FIG. 6 is a perspective view showing the structure of an optical coupler realized by optical waveguides formed on a substrate; and FIG. 7 is a perspective view showing the structure of an optical coupler having an optical filter, a light-receiving element, and a light-emitting element on the optical waveguide of FIG. 6.

DETAILED DESCRIPTION OF THE PREFERRED EMBODIMENTS

The preferred embodiments of the present invention will be described with reference to FIGS. 2 to 7.

Figure 2:
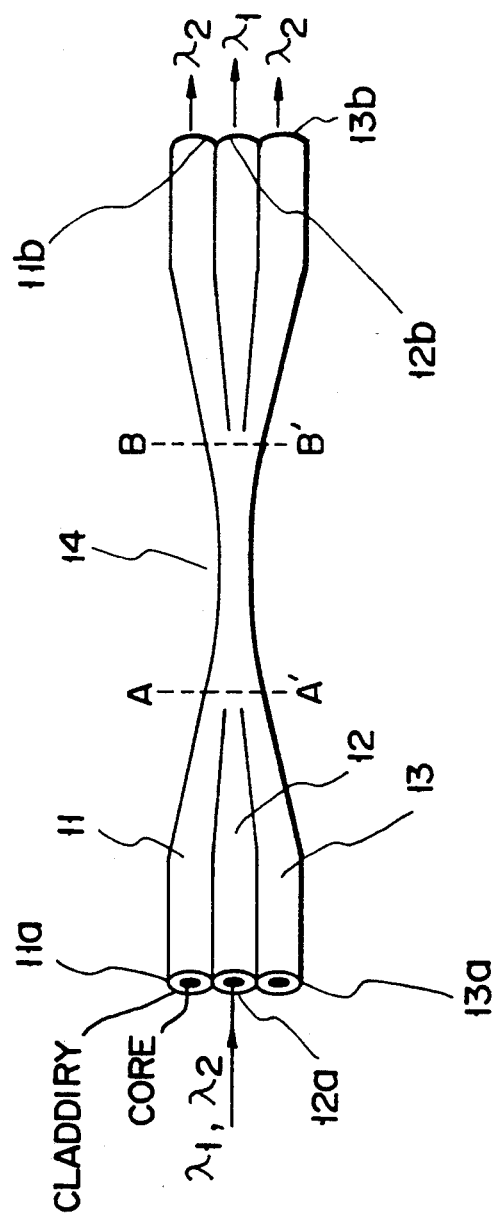

FIG. 2 shows the configuration of an optical coupler according to an embodiment of the present invention. Referring to FIG. 2, reference numerals 11, 12, and 13 denote single mode optical fibers; 11a, 12a, and 13a, input ports on which light waves are incident; and 11b, 12b, and 13b, output ports from which the light wave incident on the input port 12a is output.

Reference numeral 14 denotes a taper waist portion, which is an optical coupling region in which the three optical fibers 11, 12, and 13 are integrally coupled. The taper waist portion 14 is formed by arranging and bundling the optical fibers 11, 12, and 13 in a parallel manner, heating substantially the central portion between dotted lines AA' and BB' of FIG. 2 to thermally fuse the cladding layers of the respective optical fibers with each other, and drawing the fused portion in the axial direction of the optical fibers. In the taper waist portion 14, the optical fibers 11 and 13 are arranged to be symmetrical with each other with respect to the longitudinal direction of the optical fiber 12 a the axis.

In the optical coupler constituted in this manner, the optical field distribution is enlarged at the taper waist portion 14 serving as the optical coupling region, and distributed coupling occurs between the fused optical fibers.

Assume that a light wave having an amplitude A2(0) is incident on the input port 12a. Considering the positional relationship of the optical fibers 11 and 13 with respect to the optical fiber 12 and the coupling mode theory, the outputs (light wave intensities) at the output ports 11b, 12b, and 13b become as indicated by the following equations (1), (2), and (3):

$$|A1(Z)/A2(0)|^2 = \tfrac{1}{2} \cdot \sin^2(\sqrt{2}kz) \quad (1)$$

$$|A2(Z)/A2(0)|^2 = \cos^2(\sqrt{2}kz) \quad (2)$$

$$|A3(Z)/A2(0)|^2 = \tfrac{1}{2} \cdot \sin^2(\sqrt{2}kz) \quad (3)$$

where Z is a taper waist length; k is a coupling coefficient between the optical fibers wherein the coupling coefficient k is a function of a wavelength $\lambda$, and it is known that the larger the $\lambda$, the larger the coupling coefficient k; and Reference numerals A1(Z), A2(Z), and A3(Z) are amplitudes at the output ports 11b, 12b, and 13b of the optical fibers 11, 12, and 13, respectively.

Since the optical fibers 11 and 13 are arranged symmetrically about the optical fiber 12 as an axis, the output (equation (1)) at the output port 11b is equal to the output (equation (3)) at the output port 13b.

FIG. 3 is a graph indicating the outputs (light wave intensities) at the output ports 11b, 13b, and 12b when light waves having wavelengths $\lambda 1 = 1.5$ μm and $\lambda 2 = 1.3$ μm are incident on the input port 12a. As is apparent from FIG. 3, the output light wave intensities at the output ports 11b and 13b and that at the output port 12b are different in accordance with the taper waist length Z.

Therefore, when the taper waist length is set at Zp in FIG. 3 where both the 1.3 μm- and 1.5 μm-wavelength light waves reach the peaks, the light wave of $\lambda 1 = 1.5$ μm is output from the output port 12b. Since the optical fibers 11 and 13 are arranged symmetrically about the optical fiber 12 as an axis, the light wave of $\lambda 2 = 1.3$ μm is output from both the output ports 11b and 13b. In this manner, the optical coupler having a preset taper length has a function of demultiplexing an incident optical coupler and outputting light waves having different wavelengths from predetermined output ports.

The taper length is set in the following manner. First, the output port 12b is connected to a photodetector via a band-pass filter that transmits the light wave having the wavelength $\lambda 1$. And the output ports 11b and 13b are connected to the photodetector via a bandpass filter which transmits the light wave having the wavelength $\lambda 2$. During formation of the taper waist portion 14, i.e., during heating and drawing the optical fibers, the light waves having the wavelengths $\lambda 1$ and $\lambda 2$ are caused to be incident on the input port 12a. In this case, the length of the taper waist 14 is set by adjusting the heating temperature and drawing speed and the like so that the intensity of the light wave that has transmitted through the band-pass filter (described above) becomes the same as that of the light wave of the wavelength $\lambda 1$ incident on the input port 12a and the like so that the intensity of the light wave on the output port 11b or 13b becomes half of the light wave of the wavelength $\lambda 2$ incident on the input port 12a.

In this manner, an optical coupler is enabled in which the $\lambda 1$-wavelength light wave is output from the output port 12b and the $\lambda 2$-wavelength light waves having the same intensity as that of the $\lambda 1$-wavelength light wave are output from the output ports 11b and 13b.

Since the optical reciprocity theorem is established in the input/output relationship of this optical coupler, when, e.g., the $\lambda 2$-wavelength light wave is incident on the output port 11b, the $\lambda 2$-wavelength light wave is output from the input port 12a. Similarly, when the $\lambda 1$-wavelength light wave is incident on the output port 12b, the $\lambda 1$-wavelength light wave is output from the output port 12a.

Figure 1:
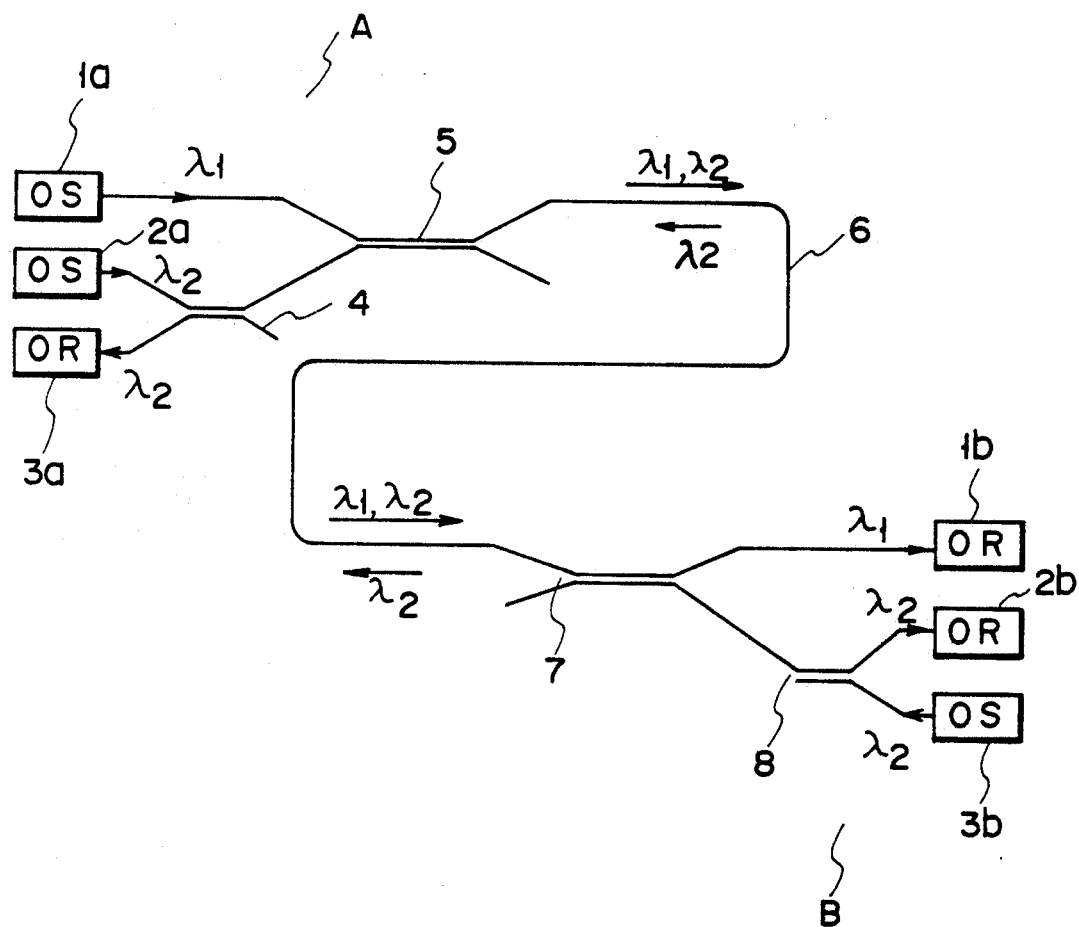
FIG. 1 is a system diagram showing the configuration of a one-directional large capacity/bidirectional small-capacity optical transmission system used in a conventional subscription type optical communication system.

FIG. 4 shows the schematic configuration of a case in which the optical coupler described above is applied to the optical transmission system of FIG. 1.

As shown in FIG. 4, in the exchange A side, an input port 12a of an optical coupler 50 of the same type as that of FIG. 2 is connected to the optical fiber 6 of FIG. 1, and output ports 12b, 11b, and 13b of the optical coupler 50 are connected to an optical transmitter 1a, an optical transmitter 2a, and an optical receiver 3a, respectively. Similarly, in the subscriber station B side, an input port 12a of another optical coupler 51 is connected to the optical fiber 6, and output ports 12b, 11b, and 13b of the optical coupler 51 are connected to an optical receiver 1b, an optical receiver 2b, and an optical transmitter 3b, respectively.

The light waves having the wavelengths λ1 and λ2 output from the optical transmitters 1a and 2a, respectively, of the exchange A are multiplexed as they pass through the optical coupler 50, and the multiplexed light waves are transmitted to the optical fiber 6. The λ1- and λ2-wavelength multiplexed light waves are demultiplexed by the optical coupler 51. The light wave having the wavelength λ1 is output from the port 12b and received by the optical receiver 1b, and the light wave having the wavelength λ2 is output from the port 11b and received by the optical receiver 2b. The λ2-wavelength light wave which is output from the optical transmitter 3b of the subscriber station B is input to the input port 13b and sent to the optical coupler 50 via the optical fiber 6. The λ2-wavelength light wave is output from the output port 13b of the optical coupler 50 and received by the optical receiver 3a.

Although the λ2-wavelength light wave sent from the optical coupler 50 of the exchange A is also output from the port 13b of the optical coupler 51, it will not become noise. Similarly, although the λ2-wavelength light wave sent from the optical coupler 51 of the subscriber station B is also output from the port 13a of the optical coupler 50, it will not become noise.

In this manner, the optical coupler of the present invention has a function of multiplexing and demultiplexing two input light waves and outputting light waves having the respective wavelengths from predetermined output ports. Therefore, when the optical couplers are respectively connected to the optical transmitters and receivers, the conventional optical multiplexer/demultiplexer and directional coupler become unnecessary. As a result, the labor of connecting the optical multiplexer/demultiplexer with the directional coupler is eliminated, loss at the connecting portion is prevented, and a good optical coupler characteristic can be obtained. Furthermore, the number of components is decreased, and the optical fiber connecting the optical multiplexer/demultiplexer with the directional coupler becomes unnecessary. Therefore, the size of the system is decreased, and the limitation regarding the place where the system is to be installed is greatly moderated.

FIG. 5 is a view showing an optical coupler according to the second embodiment of the present invention. The identical portions to those in FIG. 2 are denoted by the same reference numerals and a detailed description thereof is omitted. The same characteristic as that in FIG. 2 can be obtained even if three optical fibers 11, 12, and 13 are overlaid as shown in FIG. 5. The arrangement of the optical fibers is not limited to those of FIGS. 2 and 5 as far as the connection states (e.g., the form of the fused cladding layers and the taper waist length) between the optical fibers 11 and 13 and between the optical fibers 11 and 12 are the same.

When a light wave is incident on one of ports 11b, 12b, and 13b, light waves are sometimes emitted from ports 11a and 13a. The emitted light waves are reflected by the end faces, returned to the ports 11b, 12b, and 13b, and become noise. If an adhesive 15 is applied to the end face of each of the ports 11a and 13a, as shown in FIG. 5, reflectionless termination occurs at the ports 11a and 13a, and the noise described above is greatly decreased. It is a matter of course that the reflectionless termination by using the adhesive is applicable to the embodiment of FIG. 2.

FIG. 6 shows an embodiment in which the optical coupler of the present invention uses optical waveguides. In FIG. 6, reference numerals 22, 23, and 24 denote optical waveguides formed in a substrate 30. The optical waveguide 23 is formed to connect input and output ports 21 and 26 as two points. The optical waveguides 22 and 24 are formed to be linearly symmetrical with each other with respect to the longitudinal direction of the optical waveguide 23 as the axis of symmetry. One port 25 of the optical waveguide 22 and one port 27 of the optical waveguide 24 are at the same distance from the output port 26. The optical waveguides 22 and 24 are formed to be gradually closer to the optical waveguide 23 when seen from the output port 26 in the direction of the input port 21. In a region 31, the gap between the optical waveguides 24 and 23 are very short compared to the gap between the ports 27 and 26.

The region 31 is an optical coupling region in which distributed coupling occurs between the close optical waveguides 22 and 23 and between the close optical waveguides 23 and 24. Broken lines CC'- DD' roughly indicate the position of the optical coupling region 31. Distributed coupling can occur outside the lines CC'- DD'. In the optical coupling region 31, when a light wave having a wavelength λ1 and a light wave having a wavelength λ2 different from the wavelength λ1 are input, energy exchange takes place between the two light waves.

When the λ1- and λ2-wavelength light waves are incident on the input port 21 of this optical coupler, the two light waves are demultiplexed by the optical coupling region 31 since the wavelengths λ1 and λ2 have different perfect coupling lengths. As described above, the optical waveguides 22 and 24 are symmetrically arranged with each other about the optical waveguide 23 as the center. Therefore, when the coupling length of the optical coupling region 31 is set such that the λ1-wavelength light wave is output from the output port 26 of the optical waveguide 23, the λ2-wavelength light waves are output from both the optical waveguides 22 and 24.

In the optical coupler having the optical coupling region 31 of the coupling length preset in this manner, when the λ1-wavelength light wave is incident on the output port 26, it is output from the output port 21 because of the optical reciprocity theorem. Therefore, the optical coupler shown in FIG. 6 has two functions including the optical multiplexing/demultiplexing function and the function as the directional coupler in the same manner as the optical coupler shown in FIG. 2.

Therefore, the optical coupler of this embodiment can be applied to the optical transmission system shown in FIG. 1 to obtain the same effect as the optical coupler of FIG. 2.

FIG. 7 is a view showing an embodiment in which a semiconductor element and an optical element are integrally packaged in the optical coupler of FIG. 6. The embodiment of FIG. 7 is made to be employed by the subscriber station B of the optical transmission system of FIG. 1. Referring to FIG. 7, reference numeral 40 denotes a light-receiving element such as a photodiode which is provided on the optical waveguide 23. Reference numeral 41 also denotes a light-receiving element provided on the optical waveguide 24. Reference numeral 42 denotes a light-emitting element such as a laser diode which is provided on the optical waveguide 22. A light-receiving element 43 for monitoring the power of the light-emitting element 42 is provided on the distal end portion of the optical waveguide 22.

These optical elements correspond to optical receivers and transmitter of the subscriber station B of FIG. 1. That is, the light-receiving elements 40 and 41 correspond to the optical receivers 1b and 2b, respectively, and the light-emitting element 42 corresponds to the optical transmitter 3b. When the optical coupler is designed as shown in FIG. 7, axis alignment requiring high precision is needed only for the connection of the optical waveguide 23 with the optical fiber 6 as the transmission path.

As a result, the assembly is greatly simplified, the number of components is decreased, and the system of the subscriber station can be made small. Since the optical multiplexer/demultiplexer and the directional coupler are formed at one portion by distributed coupling of the three optical waveguides, the substrate size can be greatly decreased. Accordingly, the number of optical integrated circuits obtained from a single wafer is increased, and the mass productivity is greatly improved.

If optical crosstalk is large, an optical filter can be formed midway along the waveguide. Reference numeral 44 of FIG. 7 denotes such an optical filter. The optical filter 44 is a diffraction grating whose grating pitch is so determined as to transmit only the light wave having the wavelength λ1. When the optical filter 44 is placed before the light-receiving element 40, the λ2-wavelength light wave can be prevented from being incident on the light-receiving element 40. An optical filter can be similarly provided before the light-receiving element 41.

As has been described above in detail, according to the optical coupler of the present invention, the three optical transmission paths are partly integrated or formed close to each other to provide a region in which these optical transmission paths perform distributed coupling. Therefore, a function of multiplexing/demultiplexing two different wavelengths and a function of outputting an incident light wave from a predetermined output port in accordance with a wavelength can be realized by a single coupler. As a result, optical multiplexer/demultiplexer and directional coupler conventionally used in e.g., a one-directional large-capacity/bidirectional small-capacity subscription type communication system adapting time-base compression become unnecessary. Thus, connection loss caused by connecting optical components and the system size can be decreased.

Additional advantages and modifications will readily occur to those skilled in the art. Therefore, the invention in its broader aspects i not limited to the specific details, and representative devices shown and described herein. Accordingly, various modifications may be made without departing from the spirit or scope of the general inventive concept as defined by the appended claims and their equivalents.

What is claimed is:

1. An optical Wavelength Division Multiplexer WDM coupler comprising:
    a first optical transmission path having one port as an incident port of a first light wave having a first wavelength and a second light wave having a second wavelength different from the first wavelength; and
    second and third optical transmission paths distributed-coupled to said first transmission path intervening therebetween in such a manner that portions of said second and third optical transmission paths are symmetrical with respect to an axis of said first optical transmission path;
    wherein a coupling length of said first optical transmission path and said second and third optical transmission paths is set such that, when the first light wave and the second light wave are input to the one port of said first optical transmission path, the first light wave is output from only a second port of said first optical transmission path, and the second light wave passes through only the second and third optical transmission paths coupled to the first optical transmission path and is output from a respective port of each of the second and third optical transmission paths.

2. An optical coupler according to claim 1, wherein the first wavelength is 1.5 μm and the second wavelength is 1.3 μm.

3. An optical coupler according to claim 1, wherein said first to third optical transmission paths are respectively single mode optical fibers.

4. An optical coupler according to claim 3, wherein each of said single mode optical fibers has a biconical taper shape, and said optical coupling means distributed-couples cladding layers of said optical fibers with each other by thermal fusion.

5. An optical coupler according to claim 3, further comprising termination treating means for performing a reflectionless termination for portions of said optical fibers constituting said second and third optical transmission paths which are on the same side as said incident port of said optical fiber constituting said first optical transmission path.

6. An optical coupler according to claim 1, wherein said first to third optical transmission paths are respectively optical waveguides formed on a substrate.

7. An optical coupler according to claim 6, further comprising a light-emitting element arranged on at least one of said optical waveguides constituting said first to third optical transmission paths.

8. An optical coupler according to claim 6, further comprising a light-receiving element arranged on at least one of said optical waveguides constituting said first to third optical transmission paths.

9. An optical coupler according to claim 6, further comprising an optical filter arranged on at least one of said optical waveguides constituting said first to third optical transmission paths.

10. An optical coupler according to claim 1, wherein one-directional large-capacity optical transmission is performed with the first light wave and bidirectional small-capacity optical transmission in accordance with time-compression multiplexing technique is performed with the second light wave.

* * * * *